(12) United States Patent
Xu (10) Patent No.: US 9,080,556 B2
(45) Date of Patent: Jul. 14, 2015

(54) VERTICAL SHAFT WIND POWER SYSTEM AND AN EQUIPMENT FOR AUTOMATICALLY ADJUSTING THE ANGLE OF THE FAN BLADE

(76) Inventor: Zhiwen Xu, Pudong (CN)

( * ) Notice: Subject to any disclaimer, the term of this patent is extended or adjusted under 35 U.S.C. 154(b) by 454 days.

(21) Appl. No.: 13/058,459

(22) PCT Filed: Nov. 19, 2010

(86) PCT No.: PCT/CN2010/078904
§ 371 (c)(1),
(2), (4) Date: Sep. 7, 2012

(87) PCT Pub. No.: WO2011/085615
PCT Pub. Date: Jul. 21, 2011

(65) Prior Publication Data
US 2012/0321469 A1    Dec. 20, 2012

(30) Foreign Application Priority Data

Jan. 14, 2010 (CN) .......................... 2010 1 0022775

(51) Int. Cl.
*F03D 3/06*    (2006.01)

(52) U.S. Cl.
CPC ............. *F03D 3/068* (2013.01); *F05B 2260/76* (2013.01); *F05B 2270/32* (2013.01); *F05B 2270/321* (2013.01); *Y02E 10/74* (2013.01)

(58) Field of Classification Search
CPC ................. F03D 3/068; F05B 2260/76; F05B 2270/321; F05B 2270/32; Y02E 10/74
USPC ...................... 415/4.2, 4.4, 122.1, 124.1, 140, 415/146–148, 150, 908; 416/9, 13, 416/110–112, 117, 119, 153, 168 R, 170 R, 416/205
See application file for complete search history.

(56) References Cited

U.S. PATENT DOCUMENTS

3,902,072 A * 8/1975 Quinn .............................. 290/44
4,260,328 A * 4/1981 Hamel ............................ 416/17
(Continued)

*Primary Examiner* — Dwayne J White
*Assistant Examiner* — William Grigos
(74) *Attorney, Agent, or Firm* — Steven M. Greenberg; Gary H. Monka; CRGO Law (57) ABSTRACT

The present invention relates to a vertical shaft wind power system and an equipment to adjust the angle of the fan blade automatically, the system includes an equipment to adjust the fan blade automatically, in which the outboard side of the rotary support is pivotally connected with the back of the fan blade, the inner side of the rotary support is connected with the fan blade support plate, which is arranged in the vertical shaft wind power system and the rotary can roll together with the fan blade support plate; the power device is associated with the lower end of the positioning shaft to drive the positioning shaft to rotate; the rotary crankshaft is associated with the upper end of the positioning shaft, the rotary crankshaft can rotate with the positioning shaft synchronously; the eccentric shaft is arranged on the eccentric position of the rotary crankshaft, the eccentric shaft is sleeved with eccentric shaft, the eccentric shaft can rotate around the eccentric shaft; the outer end of the fan blade draw bar is rotatably connected with the fan blade, the inner end of the fan blade is rotatablely connected with the eccentric plate; the mechanism consists of the rotary support, the fan blade draw bar and the fan blade can adjust the angle of the fan blade automatically, when the power device make the positioning shaft associated with the wind direction, the fan blade can rotate with wind to turn the windward side of the fan blade to the best position.

10 Claims, 7 Drawing Sheets

(56) References Cited

U.S. PATENT DOCUMENTS

| | | | |
|---|---|---|---|
| 4,299,537 A * | 11/1981 | Evans | 416/119 |
| 4,303,835 A * | 12/1981 | Bair | 290/55 |
| 6,379,115 B1 * | 4/2002 | Hirai | 416/17 |
| 6,840,738 B1 * | 1/2005 | Swanberg | 416/17 |
| 7,766,602 B1 * | 8/2010 | Stroburg | 415/4.2 |
| 2009/0136346 A1 * | 5/2009 | Kelly | 416/131 |
| 2010/0084863 A1 * | 4/2010 | Potter | 290/44 |

* cited by examiner

VERTICAL SHAFT WIND POWER SYSTEM AND AN EQUIPMENT FOR AUTOMATICALLY ADJUSTING THE ANGLE OF THE FAN BLADE

CROSS-REFERENCE TO RELATED APPLICATIONS

This application is a §371 national stage entry of International Application No. PCT/CN2010/078904, filed Nov. 19, 2010, which claims priority to Chinese Patent Application No. 201010022775.0, filed Jan. 14, 2010.

FILED OF THE INVENTION

The present invention relates to a vertical shaft wind power system and an equipment to adjust the angle of the fan blade automatically.

BACKGROUND OF THE INVENTION

The Chinese patent publication CN1858438 disclosed a kind of vertical shaft wind power system, which does not have a shaft in the pivot of the fan blade. The fan blade turning round the shaft forms a wind wheel. And the range of the rotational angle of the fan blade is controlled by the automatic control system. Hence, the blade will achieve the best blade rotational angle in different positions.

However, no matter which way is adopted to change the rotational angle of the blade, there will still be the following defects:

When the rotational blades are in the surface following the wind, the angle between the wind and the rotational blades can not be 90°. Thus the fan blades can not face the wind in the best position. And when the fan blades are in the surface against the wind, the angle between the wind and the fan blades cannot be 0°. Hence, the wind power cannot be utilized sufficiently.

The Chinese patent publication CN101260865 disclosed a kind of an automatically adjusted angle fan blades, which makes the rotation shaft of the blade and the drive shaft related through the transmission of the meshing gears or chains. Then the fan blades will always be in the best position.

Nevertheless, there is a defect that the drive shaft and the blades are transmitted through meshing gears or chain directly, so that it will make the load too heavy when the fan blades are turning. Therefore the wind energy can not be utilized sufficiently, and that is also not conducive to the commercial development of the products.

The Chinese patent publication CN101260865 applies the hydraulic device to adjust the angle of fan blade, such as: hydraulic pump, hydrocylinder, hydraulic control valve and hydraulic accumulator and other accessories, in order to control the horizontal and vertical extension of the fan blade, thus to turn the fan blades to the best windward surface and to make full use of the wind power.

But the existing defect is that as the device adopts hydraulic equipment, such as: hydraulic pump, hydro cylinder, hydraulic control valve and hydraulic accumulator and other accessories, to control the stretch of the fan blade. The system control devices are added. Therefore the power consumption of the devices themselves greatly reduces the efficiency of the power generation.

SUMMARY OF THE INVENTION

The purpose of the present invention is to provide a wind power system with the vertical shaft and an equipment to adjust the angle of the fan blade automatically, which can adjust the windward angle by a linkage mechanism automatically.

In order to achieve the purpose, the present invention disclosed an equipment for the wind power system with the vertical shaft to adjust the angle of the fan blade automatically, which is characterized in that it includes: a rotary support, whose outboard is pivotally connected with the back of the fan blade; the inner side of the rotary support is used to connect the support plate for the fan blade; the support plate for the fan blade is rotatable relative to the input shaft of the wind power system with the vertical shaft; a positioning shaft; a power device which is associated with the lower end of the positioning shaft, so as to drive the positioning shaft to roll; a rotary crankshaft, which is associated with the upper end of the positioning shaft synchronously, and it can roll together with the positioning shaft; an eccentric shaft, which is arranged on the eccentric position of the rotary crankshaft; an eccentric plate is sleeved on the eccentric shaft, and it can turn around the central shaft of the eccentric shaft; and a draw bar for fan blade, its external end is used to connect the fan blade rotatablely and its internal end is used to connect the eccentric plate rotatablely.

The power device drives the positioning shaft to rotate, and the positioning shaft drives the rotary crankshaft to rotate, the rotary crankshaft drives the eccentric shaft to rotate; the way of the power device drives the positioning shaft can be associated with the wind direction; the rotary support, the fan blade draw bar, the fan bade and the other members constitute a four-bar linkage; the four-bar linkage can be used to adjust the rotation angle that the fan blade is rotating around the input shaft; the driving force of the four-bar linkage comes from the fan blade; the fan blade will adjust the windward angle automatically as soon as the wind power is acting on the fan blade.

The said equipment to adjust the angle of the fan blade automatically, which is further characterized in: it includes an anemoscope; the power device is equipped with a control device; the control device is connected with a sensor module; the sensor module is used to detect the deflection angle of the anemoscope and to send the wind signal to the control device; the control device controls the power device according to the wind direction sent by the sensor module, in order to make the rotation of the positioning shaft associated with the wind direction. The control device controls the power device on the basis of the signal transferred by the sensor, thereby the power device can make the windward angle of the fan blade associated with the wind direction; the wind speed is tested by the anemoscope rather than the wind rudder, thus the deflection angle of the fan blade can be more accurate.

The said equipment to adjust the angle of the fan blade automatically, which is further characterized in: it includes an anemobiagraph; the sensor module is also used to check the rotational speed of the anemobiagraph, and then it accordingly sends the wind speed signal to the control device; the control device controls the power device according to the wind speed signal sent by the sensor module, in order to make the rotation of the positioning shaft associated with the wind direction. The control device controls the power device on the basis of the signal transferred by the sensor. Thereby the power device may change and adjust the direction of the fan blade following the wind direction more accurately.

The said equipment to adjust the angle of the fan blade automatically, which is further characterized in: the directional shaft is rotatablely disposed in the shaft hole of the input shaft; the rotary crankshaft is fixed on the upper end of the directional shaft; the power device is a micro motor; the power device is connected with a reducer; the reducer and the directional shaft is connected through a coupler. The directional shaft runs throughout the shaft hole of the input shaft, which makes the structure of the equipment more compact.

In order to achieve the above purposes, the wind power system with the vertical shaft according to the present invention includes an input shaft, fan blades and a support plate for the fan blade; the fan blade support plate is rotatable relative to the input shaft of the wind power system with the vertical shaft; it is characterized in that the system also has an automatic fan blade angle adjustment device; the automatic fan blade angle adjustment device includes: a rotary support, whose outboard is pivotally connected with the back of the fan blade and the inner side of the rotary support is used to connect the fan blade support plate; the fan blade support plate is rotatable relative to the input shaft of the vertical shaft wind power system; a positioning shaft; a power device is associated with the lower end of the positioning shaft, so as to drive the positioning shaft to roll; a rotary crankshaft, which is associated with the upper end of the positioning shaft, can roll together with the positioning shaft synchronously; an eccentric shaft, which is arranged on the eccentric position of the rotary crankshaft; an eccentric plate is sleeved on the eccentric shaft, which can turn around the central shaft of the eccentric shaft; and a fan blade draw bar, whose external end is used to connect the fan blade rotatablely and its internal end is used to connect the eccentric plate rotatablely.

The power device drives the positioning shaft to rotate, then the positioning shaft drives the rotary crankshaft to rotate, then the rotary crankshaft drives the eccentric shaft to rotate; the way of the power device drives the positioning shaft can be associated with the wind direction; the rotary support, the fan blade draw bar, the fan bade and the other members constitute a four-bar linkage; the four-bar linkage can be used to adjust the rotation angle that the fan blade is rotating around the input shaft; the driving force of the four-bar linkage comes from the fan blade; the fan blade will adjust the windward angle automatically as soon as the wind power is acting on the fan blade; the fan blade is turning around the input shaft as well as rotating under the action of the four-bar linkage, so that it is able to increase the windward side of the fan blade while following the wind, and to decrease the windward side of the fan blade while against the wind.

The said vertical shaft wind power system is further characterized in that it includes an anemoscope; the power device is equipped with a control device; the control device is connected with a sensor module; the sensor module is used to detect the deflection angle of the anemoscope and to send the wind signal to the control device; the control device controls the power device according to the wind direction sent by the sensor module, in order to make the rotation of the positioning shaft associated with the wind direction.

The said vertical shaft wind power system is further characterized in that it includes an anemobiagraph; the sensor module is also used to check the rotational speed of the anemobiagraph and then it accordingly sends the wind speed signal to the control device; the control device controls the power device according to the wind speed signal sent by the sensor module, in order to make the rotation of the positioning shaft associated with the wind direction. The said vertical shaft wind power system is further characterized in that the directional shaft is rotatablely disposed in the shaft hole of the input shaft; the rotary crankshaft is fixed on the upper end of the directional shaft; the power device is a micro motor; the power device is connected with a reducer; the reducer and the directional shaft is connected through a coupler.

The system controls the directional shaft rotating through the wind speed and the wind direction, which can make the rotation of the directional shaft associated with the changing of the wind direction accurately.

The said vertical shaft wind power system is further characterized in that the eccentric direction of the eccentric shaft which is arranged on the rotary crankshaft is perpendicular to the direction of wind. In the joint action of the fan blade draw bar and the rotary support, the fan blade will arrive at a maximum upwind location and a minimum upwind location when the fan blade is rotating around the central axis of the input shaft. When the fan blade is in the maximum upwind location, the windward side of the fan blade is perpendicular to the wind. When the fan blade is in the minimum upwind location, the windward side of the fan blade is parallel with the wind. When the system is working, the fan blade may turn from the maximum upwind location to the minimum upwind location after turning 180°, and the fan blade may turn from the minimum upwind location to the maximum upwind location after turning 180°.

The said vertical shaft wind power system is further characterized in that the reducer is a turbo-worm reducer.

When the wind direction is changing, the angle between the direction of the fan blade and the eccentric direction of the eccentric shaft is 0°. At this moment the windward side of the fan blade faces the wind vertically, so that the windward side of the fan blade suffers the maximum wind power. When the wind direction is unchanging (the power device or the motor does not work), the fan blade rotates around the input shaft to 90° position, at that time the windward side of the fan blade (rotated 90°) suffers the minimum wind power, so that the system can adjust the angle of the fan blade automatically; and the fan blade can adjust windward automatically, so that the system can make full use of the wind power, even a very small wind can make the fan blade work; the present invention overcome the defects of the prior art that the wind driven generator needs the larger wind power to achieve the rated power; the present invention greatly improves the utilization of the wind driven generator, and it reduces idle time of wind driven generator.

BRIEF DESCRIPTION OF THE DRAWINGS

FIG. 1 to FIG. 6 are the schematic diagrams of the embodiment 1 according to the present invention, wherein:

FIG. 7 to FIG. 8 is the structure diagrams of the embodiment 2 according to the present invention, wherein:

DETAILED DESCRIPTION OF THE INVENTION

Embodiment 1

Figure 1:
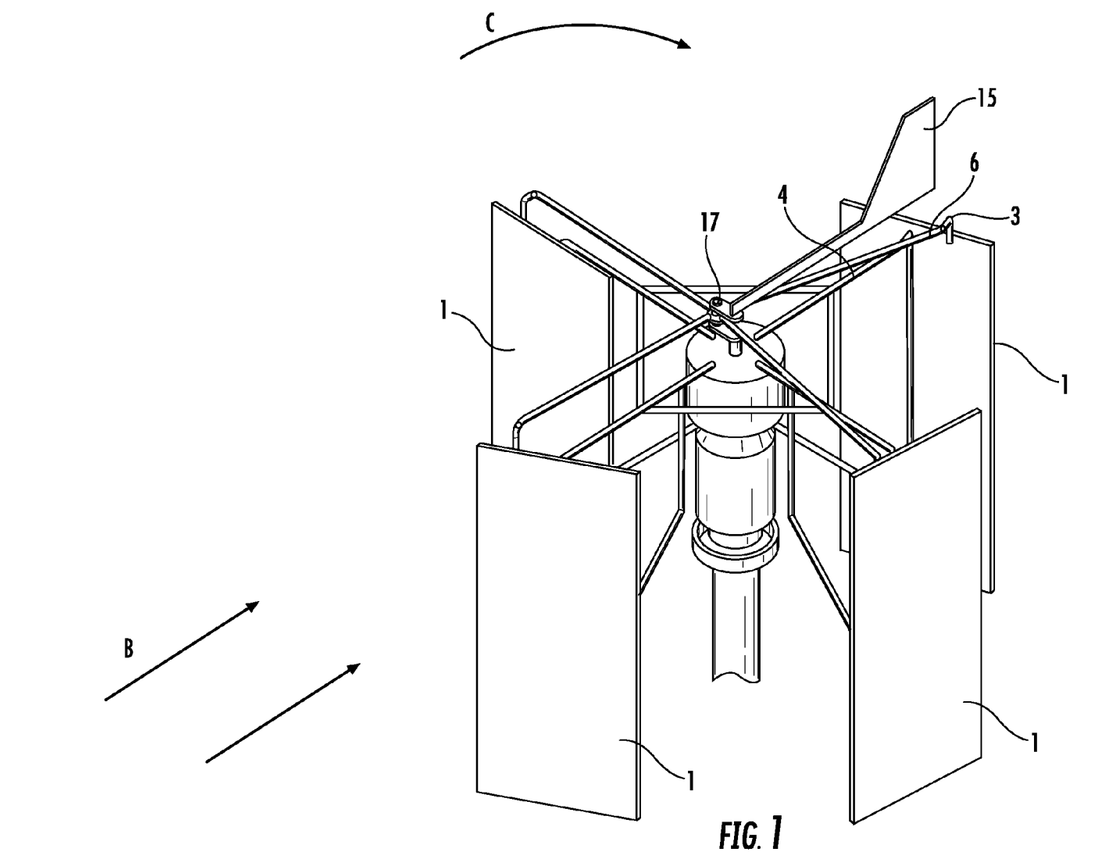
FIG. 1 is the three-dimensional schematic diagram of the present invention, which shows a wind power system to adjust the windward side of the fan blades.
Figure 5:
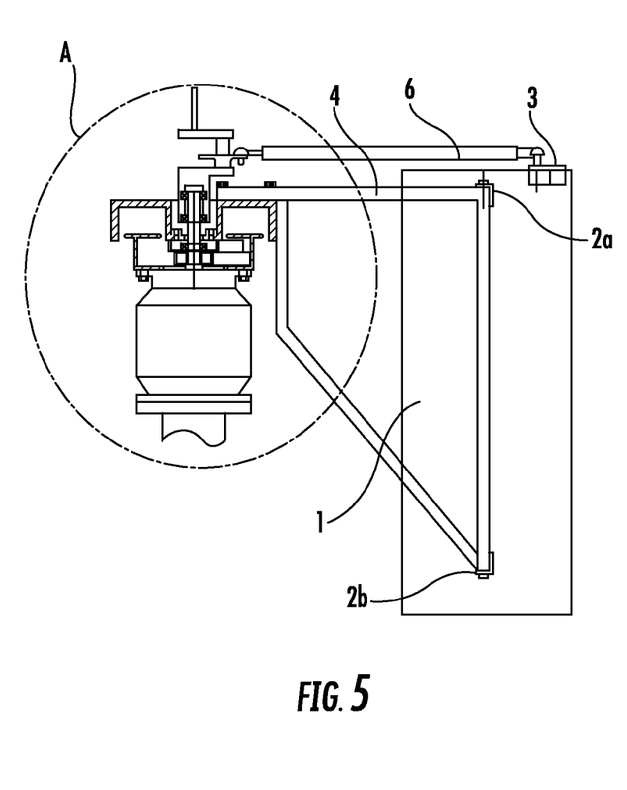
FIG. 5 is the structure diagram about the gear and the input shaft.
Figure 6:
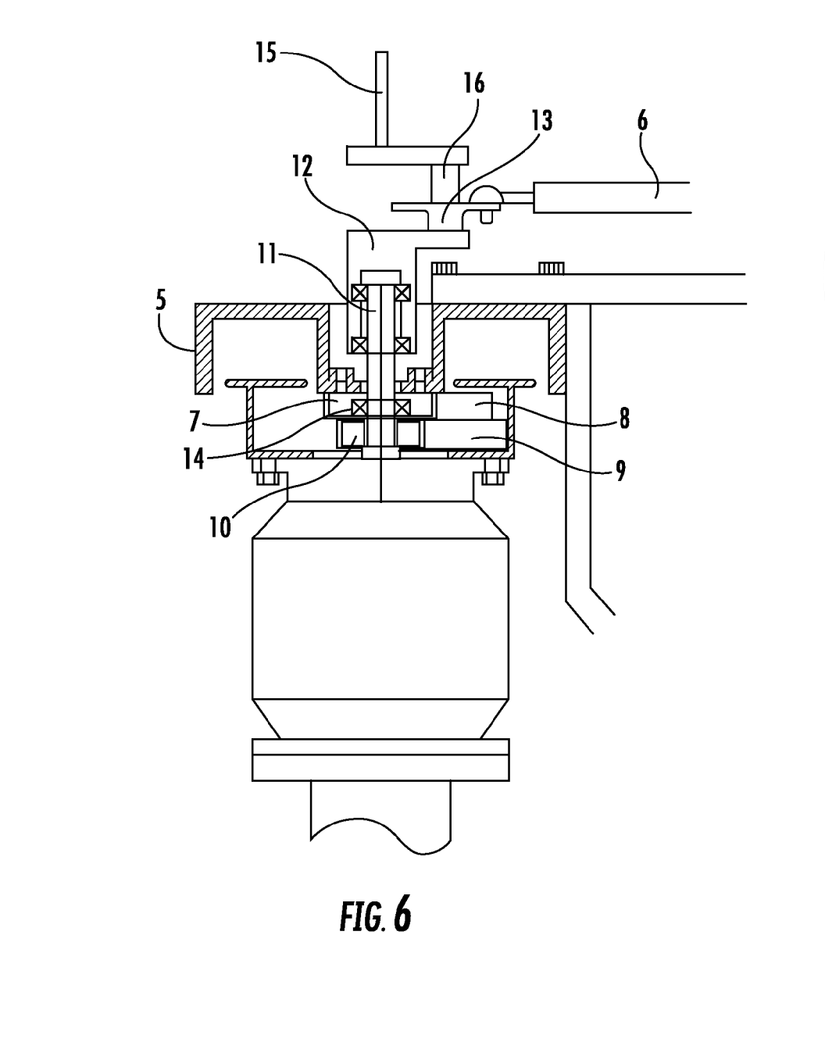
FIG. 6 is the partial enlargement schematic diagram of Position A in FIG. 5.

As shown in FIG. 1, FIG. 5 and FIG. 6, the present invention has disclosed a vertical shaft wind power system to adjust the windward of the fan blade automatically. It includes multiple fan blades 1, a rotary support 4, a fan blade support plate 5, a vertical generator input shaft 11, a transmission mechanism arranged between the fan blade support 5 and the input shaft 11. As shown in FIG. 5, an upper support 2a and a lower support 2b are arranged on the back of the fan blade 1, the outboard part of the rotary support 4 is pivotally connected with the upper support 2a and the lower support 2b (the upper and lower supports 2a, 2b are connected by pivot, they rotate around the pivot as the central axis), or they can be connected by hinge, or in other words they are rotating around an axis. The fan blade can rotate around the connection line between the upper and lower supports 2a, 2b and the rotary support 4, and the connection line is deemed as the axis. The internal side of the box is fixed on the plate support 5. An outer support 3 is fixed on the back of the fan blade 1, which is higher than the upper support 2a. The outer end of the fan blade draw bar 6 is hinged with the outer support 3.

Figure 4:
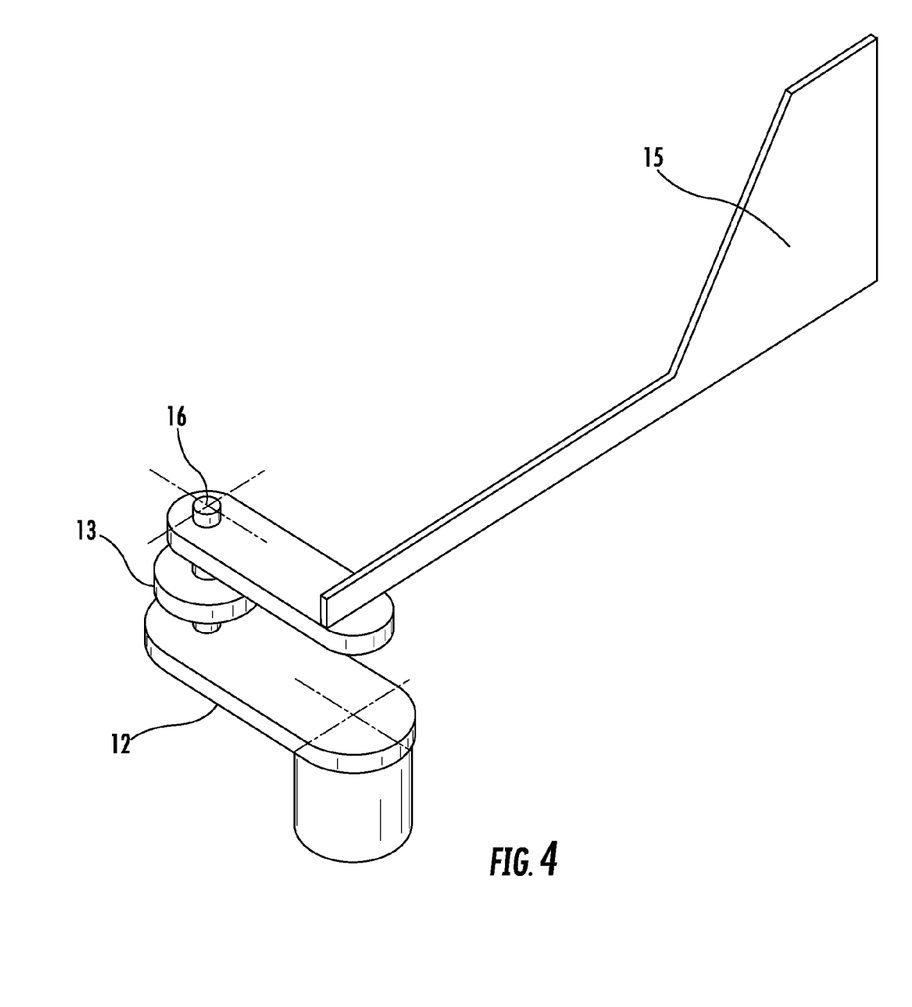
FIG. 4 is three-dimensional schematic diagram of the eccentric crankshaft.

As shown in FIG. 6, the internal side of the fan blade draw bar is hinged with the eccentric connection plate 13, and the eccentric connection plate 13 is rotatablely sleeved with the eccentric shaft 16 of the crankshaft 12. As shown in FIG. 4, the crankshaft 12 is arranged on the upper end of the input shaft 11 by a bearing; the wind rudder 15 is fixedly arranged on the upper end of the eccentric shaft 16; the pivot of the wind rudder and the crankshaft are in the same axes (in this example, the axes is the pivot of the input shaft 11); the windward direction of the wind rudder 15 is perpendicular to the eccentric direction (the axial direction of the crankshaft 12) of the eccentric shaft 16. It can be understood that the equipment for the fan blade to adjust the angle automatically mainly includes: the rotary support 4, the fan blade draw bar 6, the crankshaft 12, the eccentric shaft 16, the eccentric connection plate 13 and the wind rudder 15.

As shown in FIG. 6, the transmission mechanism set between the plate support 5 and the input shaft 11 includes a fan blade gear 7, a first bridge gear 8, a second bridge gear 9 and an input shaft gear 10. The plate support 5 is fixedly connected with the fan blade gear 7. The fan blade gear 7 is sleeved with the input shaft 11 by bearing 14. The fan blade 7 is meshed with the first bridge gear. The first bridge gear 8 is fixedly connected with the second bridge gear 9, and the first bridge gear 8 and the second bridge gear 9 are provided in the same axes. The second bridge gear 9 is meshed with the input shaft gear 10. The input shaft is fixedly connected on the input shaft 11.

The transmission ratio of the said gear transmission mechanism is 2:1 or 3:1. The transmission ratio can be set based on the environment of the wind field. The rotational speed of the wind driven generator can be improved when the transmission ratio is 2:1 or 3:1. The breeze can even start the wind driven generator when the transmission ratio is 1:2 or 1:3. The said gear transmission mechanism can be replaced by the belt transmission mechanism and the chain-sprocket transmission mechanism.

The transmission mechanism of the vertical shaft wind power system to adjust the windward of the fan blade automatically according to the present invention can be removed. The fan blade support plate 5 and the input shaft 11 are directly fixed on the same axis, so that they can rotate synchronously.

Figure 3:
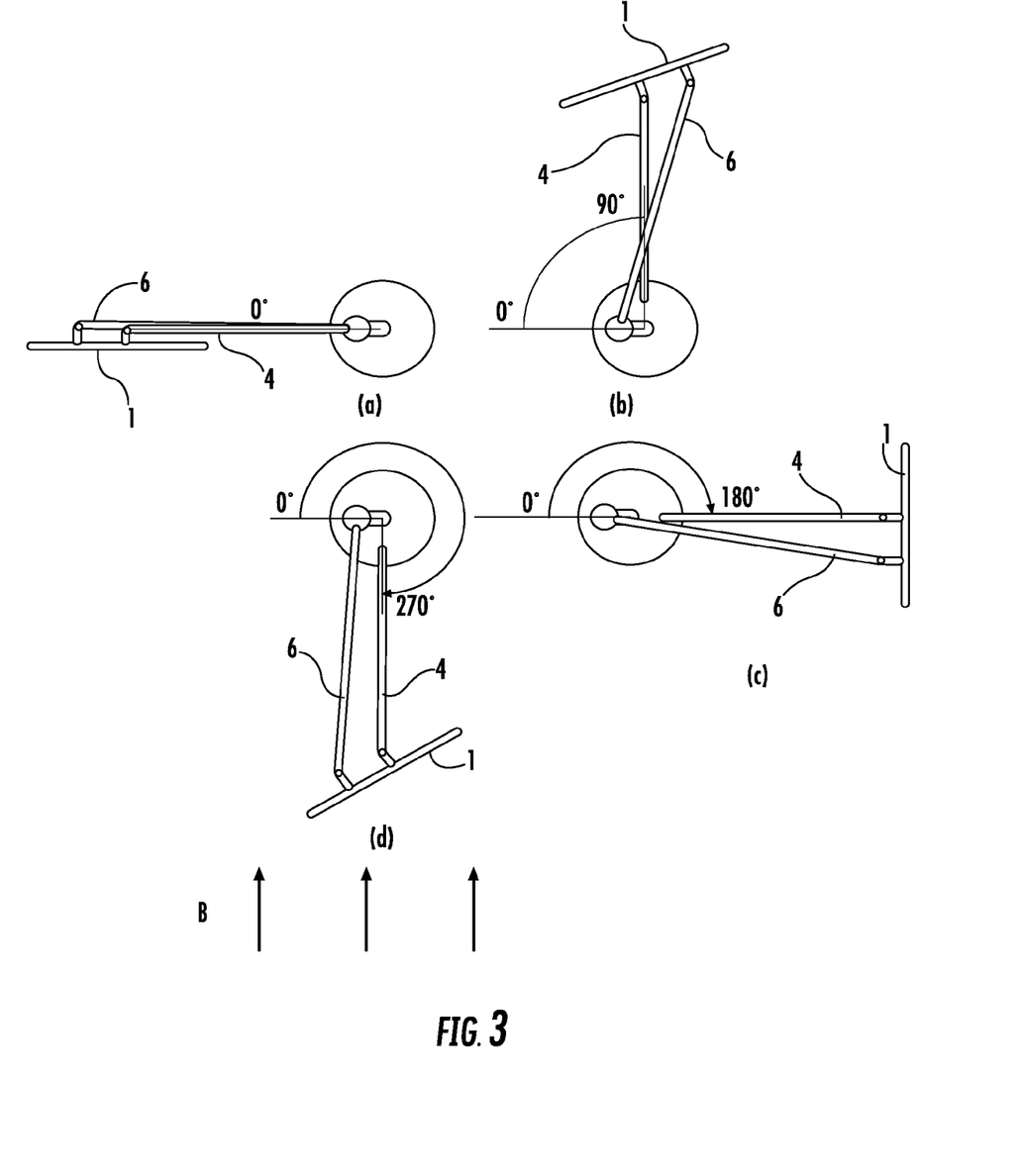
FIG. 3 is the steering positions diagram of the fan blades pulled by the fan blade draw bar, in which (a) is the schematic diagram for the initial position, (b) is the schematic diagram for the 90 degree turned position, (c) is the schematic diagram for the 180 degree turned position, (d) is the schematic diagram for the 270 degree turned position.

The operation way of the vertical shaft wind power system to adjust the windward of the fan blade automatically according to the present invention is as follows:

As shown in FIGS. 5, 6 and 3, the upper and lower supports 2a, 2b which are fixed on the back of the fan blade 1 are connected with the outboard side of the rotary support 4, so that the fan blade 1 on the rotary support 4 can rotate freely. The outer support 3 is rotating around the eccentric shaft 16 through the fan blade draw bar 6 and the eccentric connection plate 13. As shown in FIG. 1, when the direction of the fan blade is the same as the eccentric direction, the outer support 3 is farthest away from the axes of the input shaft 11, and the windward surface of the fan blade is perpendicular to the wind direction b, therefore the fan blade revolves along the direction of C. In FIG. 1, each rotary support 4 are connected together by supporting bar 17. When the direction of the fan blade is opposite to the eccentric direction, the outer support 3 is nearest away from the axes of the input shaft 11. The windward of the fan blade 1 faces the wind vertically. As shown in FIG. 3 (a)-(c), when the direction of the wind rudder 15 is determined through the wind, the vertical direction of the eccentric shaft 16 and the wind rudder 15 is deemed as 0 degree, i.e. the fan blade 1 in the eccentric direction of the eccentric shaft 16 is 0 degree. The windward side of the fan blade faces the wind vertically, so that the windward side of the fan blade suffers the maximum wind power. When the direction of the eccentric shaft 16 and the wind rudder 15 is unchanged, the fan blade turns 180 degree around the input shaft 11, the windward side (rotates 90 degree) of the fan blade suffers the minimum wind power.

Figure 2:
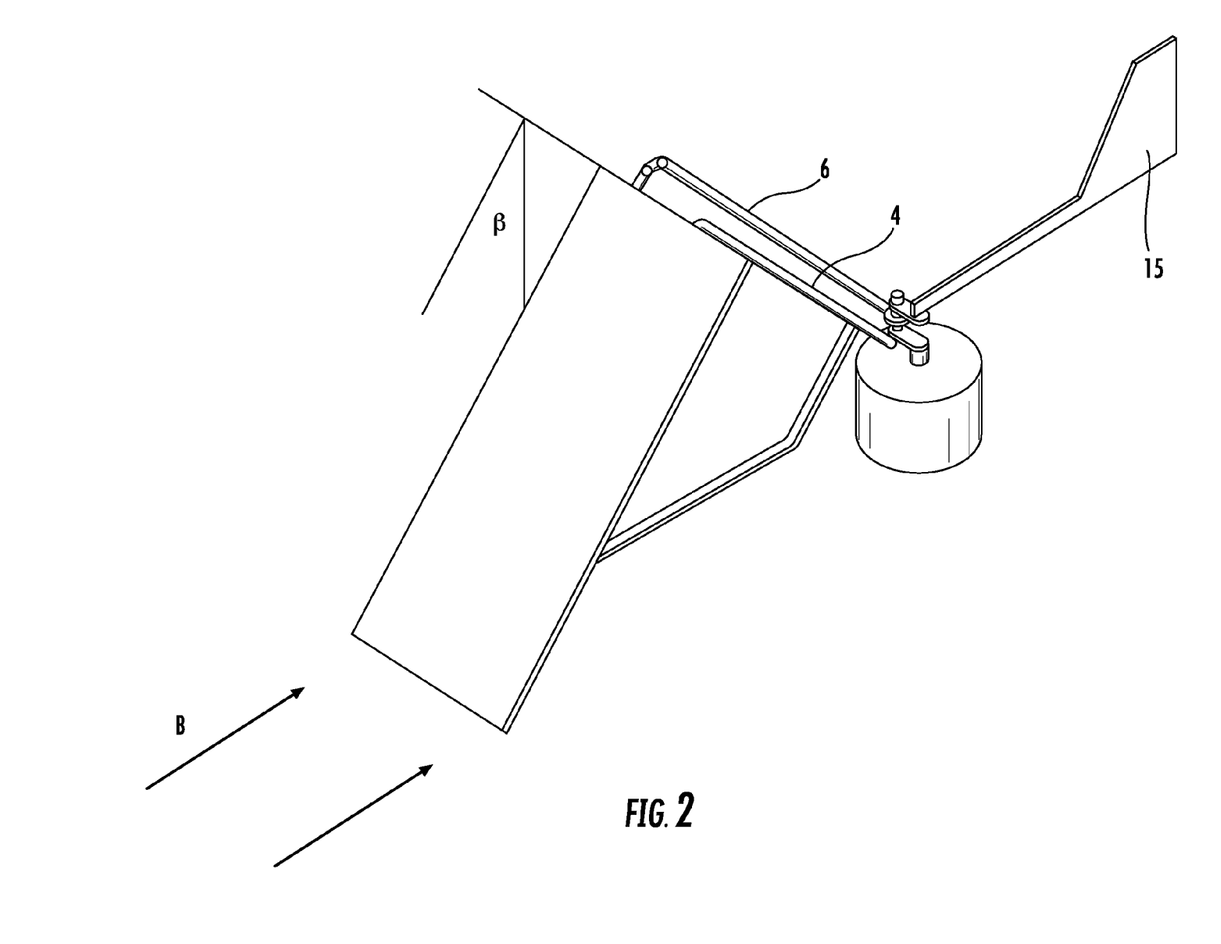
FIG. 2 is the three-dimensional schematic diagram when the fan blade is at the location which is perpendicular to the wind direction and has an upward angle of elevation of 0.01-85 degree.

As shown in FIG. 2, the fan blade 1 can not only be arranged vertically but also can be arranged to be vertical to the wind direction and have an upward angle of elevation β of 0.01-85 degree.

Embodiment 2

The mechanism to adjust the angle of the fan blade automatically in embodiment 1 has following disadvantages: when the windward side of the corner fan blade is following the wind, the fan blade draw bar arranged in the corner fan blade will have a small power onto the eccentric plate. At this time, the wind rudder will deviate from the wind direction, thus the fan blade direction can not meet with the wind direction best. The angle between the corner fan blade and the wind direction cannot be 0 degree when the corner fan blade is against the wind, therefore the wind power cannot be used sufficiently. On the other side, if the wind rudder is not expected to be deviate from the wind direction, the wind rudder must be made in very large size. This is not conducive to the development of the above-medium wind power device, and is also not conducive to the commercial development of products.

Figure 7:
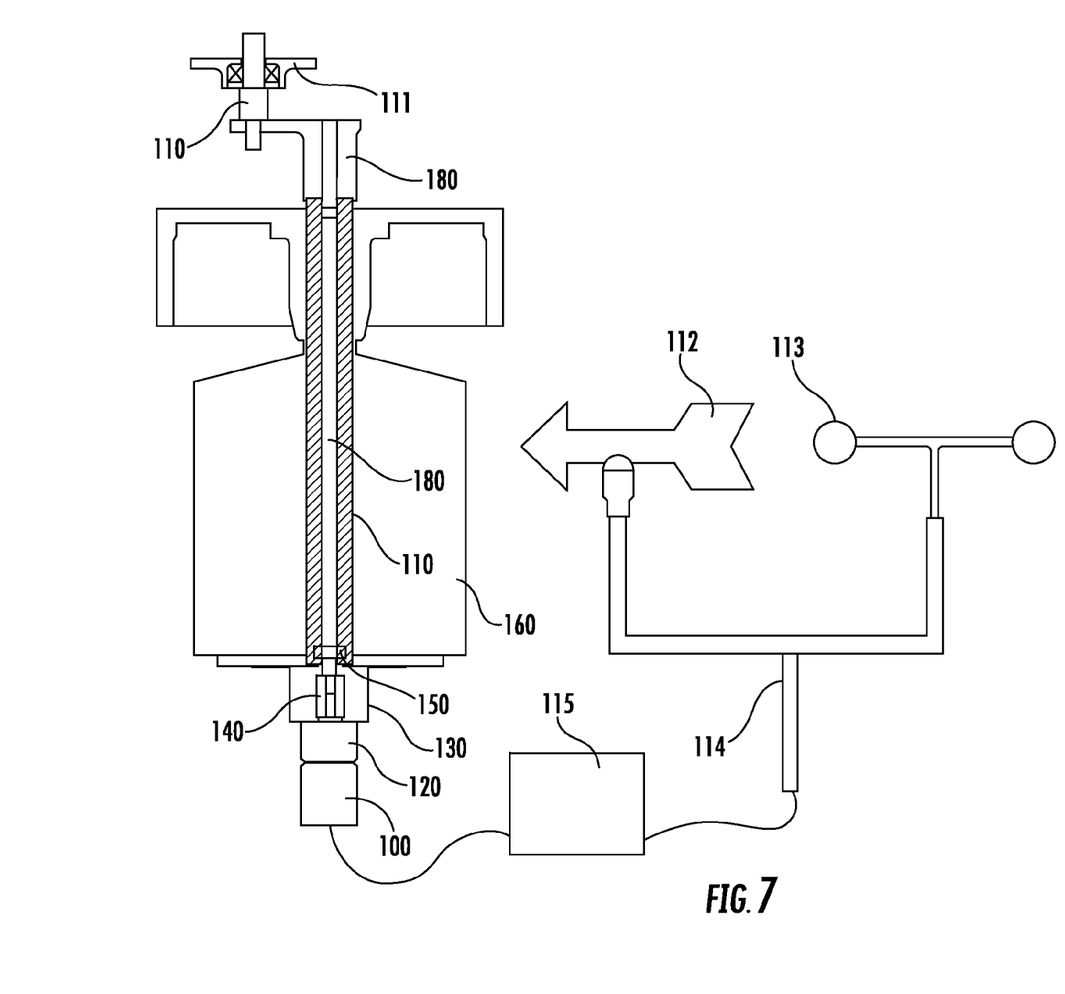
FIG. 7 is the structure diagram of the wind tracking mechanism.

In embodiment 2, the mechanism to adjust the angle of the fan blade automatically is improved on the basis of the embodiment 1. The wind rudder is removed. As shown in FIG. 7, the mechanism to adjust the angle of the fan blade automatically includes a motor 100, a directional shaft 180, a rotary support 190, an eccentric shaft 110, an eccentric plate 111. Just like in the embodiment 1, the mechanism also includes the fan blade draw bar and the rotary support. The arrangement of the fan blade draw bar and the rotary support is the same as the embodiment 1. The inner side of the fan blade is connected on the eccentric plate and the outer side of the fan blade is connected with the fan blade.

As shown in FIG. 7, the (micro) motor 100 is connected with a reducer 120, and the reducer 120 is connected with the coupling 140, and the coupling 140 is connected with the directional shaft, and the directional shaft is rotationally disposed in the shaft hole of the input shaft 170 through the bearing 150. The motor 100 and the reducer 120 are supported under the input shaft 170 by the support frame 130. The upper end of the directional shaft 180 is fixedly connected with the rotary crankshaft 190. The eccentric position of the rotary crankshaft 190 is fixed on an eccentric shaft 110. An eccentric plate 111 is rotationally fixed on the eccentric shaft, and the eccentric plate 111 is pivotally connected with the eccentric shaft 110. The eccentric shaft 110 is rotating around the directional shaft 180 as the center. When the motor 100 is working, the power of the motor 100 is transmitted from the reducer 120, after being decelerated and torque is increased, to the coupling 140, directional shaft 180. Thereby the directional shaft 180 is driven to rotate in the shaft hole of the input shaft 170.

The motor 100 is also electrically connected with the sensor module 115. The sensor module 115 is used to induce the turning of the anemoscope 112 and the turning of the anemobiagraph 113. The motor 100 is equipped with an electrical apparatus control equipment. The electrical apparatus gains the wind direction signal and the wind speed signal from the sensor module 115, and the electrical apparatus control equipment controls the speed and the steering direction of the motor 100 according to the wind direction signal and the wind speed signal.

Figure 8:
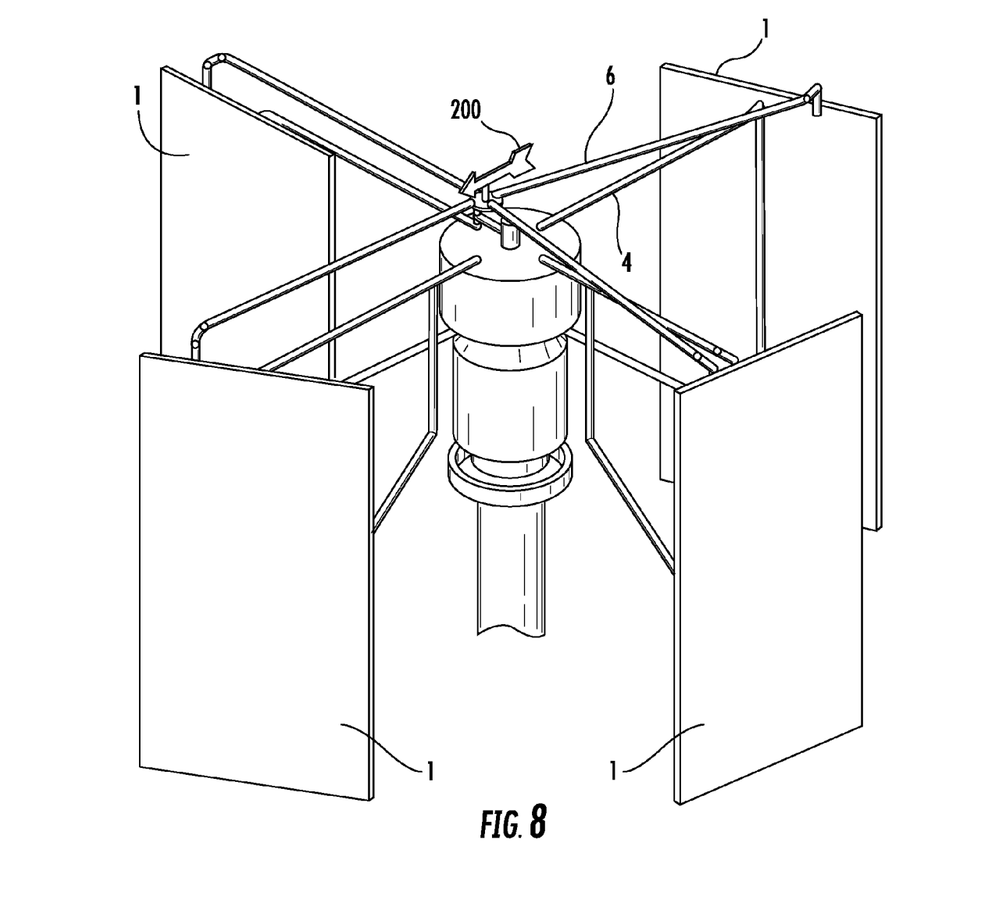
FIG. 8 is the three-dimensional schematic diagram of the vertical shaft wind power device which is equipped with the wind tracking mechanism shown in the FIG. 7.

As shown in FIG. 8, the difference from the embodiment 1 is that the internal part of the fan blade draw bar 6 is connected with the eccentric plate 111, which is shown in FIG. 7. Just like in the embodiment 1, the outer ends of the rotary support 4 is connected with the fan blade 1, and the inner ends of which is connected with the fan blade support plate.

As shown in FIG. 8, the reference of wind direction is according to the arrowhead (which can be virtual) arranged on the eccentric. Just like in the embodiment 1 (shown in FIG. 3), when the eccentric direction (the direction is determined by the line between the position of the eccentric shaft arranged on the rotary crankshaft and the center of the crankshaft 190) of the eccentric shaft 110 is perpendicular to the wind direction, the windward side of the fan blade faces the wind vertically. The windward side of the fan blade suffers the biggest wind power. When the wind direction remains unchanged, the fan blade turns 180 degree around the input shaft. The windward side of the fan blade is parallel to the wind direction when the fan blade has turned 180 degree, at this time the windward side of the fan blade suffers the minimum wind power. The function that the fan blade can adjust its angle automatically is therefore realized, and the fan blade can adjust its windward automatically to make full use of the wind power.

If the wind direction is changed, the eccentric shaft can be controlled by the motor to rotate with the wind (the eccentric direction of the eccentric shaft is perpendicular to the wind direction all the time). The sensor module 115 controls the motor according to the rotation of the anemoscope 112, and the motor controls the rotation angle of the directional shaft 180. The sensor module 115 controls the motor according to the rotating of the anemobiagraph 113, and the motor controls the speed of the directional shaft 180. Through this analysis, the system can determine the wind direction and adjust the angle of the fan blade precisely. The reducer 120 can be a turbo-worm reducer or a gear reducer. According to the setting of the reduction ratio, the transmission from the motor 100, the reducer 120, the coupling 140, the directional shaft 180 to the rotary crankshaft 190 will be a one-way transmission, because the power that the fan blade exerted on the crankshaft 190 is not enough to drive the reducer 120.

The invention claimed is:

1. An assembly to automatically adjust the angle of a fan blade for a vertical shaft wind power system, comprising:
   a rotary support including an outer end and an inner end, the outer end pivotally connected to a back of the fan blade;
   the inner side of the rotary support connected to a support plate for the fan blade;
   the support plate for the fan blade is rotatable relative to an input shaft of the vertical shaft wind power system;
   a positioning shaft;
   a power device associated with a lower end of the positioning shaft to rotate the positioning shaft;
   a rotary crankshaft associated with an upper end of the positioning shaft, the rotary crankshaft and the positioning shaft arranged to rotate together;
   an eccentric shaft disposed at an eccentric location relative to a longitudinal axis of the rotary crankshaft, and an eccentric plate rotatably coupled to the eccentric shaft, such that the eccentric plate can rotate around the eccentric shaft; and
   a draw bar for the fan blade, the draw bar including a terminal end rotatably connected to the fan blade.

2. The assembly to automatically adjust the fan blade angle recited in claim 1, further comprising:
   an anemoscope;
   wherein the power device comprises a control device; the control device connected with a sensor module; the sensor module operable to detect a deflection angle of the anemoscope and to send a wind signal to the control device; the control device controlling the power device according to wind direction responsive to the wind signal to rotate the positioning shaft based upon the wind direction.

3. The assembly to automatically adjust the fan blade angle recited in claim 2, further comprising:
   an anemobiagraph; wherein the sensor module is further operable to check the rotational speed of the anemobiagraph and to send a wind speed signal to the control device;
   the control device controlling the power device according to the wind speed signal from the sensor module, to rotate the positioning shaft based upon the wind speed.

4. The assembly to automatically adjust the fan blade angle recited in claim 1, wherein the directional shaft is rotatably disposed in a hole in the input shaft; the rotary crankshaft is fixed on an upper end of the directional shaft; the power device is a micro motor, the power device connected to a reducer; and the reducer and the directional shaft are connected through a coupler.

5. A vertical shaft wind power system comprising an input shaft, a fan blade and a fan blade support plate, the fan blade support plate rotatable relative to the input shaft; the system further comprising an automatic fan blade angle adjustment device, the automatic fan blade angle adjustment device comprising:
   a rotary support including an outer end and an inner end, the outer end pivotally connected to a back of the fan blade and the inner end of the rotary support connected to the fan blade support plate, the fan blade support plate rotatable relative to the input shaft of the vertical shaft wind power system;

a positioning shaft;

a power device associated with a lower end of the positioning shaft to rotate the positioning shaft;

a rotary crankshaft associated with an upper end of the positioning shaft the rotary crankshaft and the positioning shaft arranged to rotate together;

an eccentric shaft disposed at an eccentric location relative to a longitudinal axis of the rotary crankshaft;

an eccentric plate rotatably coupled to the eccentric shaft, such that the eccentric plate can rotate around the eccentric shaft; and a fan blade draw bar including a terminal end rotatably connected to the fan blade.

6. The vertical shaft wind power system recited in claim 5, further comprising:

an anemoscope;

wherein the power device comprises a control device; the control device connected with a sensor module; the sensor module operable to detect a deflection angle of the anemoscope and to send a wind signal to the control device; the control device controlling the power device according to wind direction responsive to the wind signal to rotate the positioning shaft based upon the wind direction.

7. The vertical shaft wind power system recited in claim 6, further comprising:

an anemobiagraph;

wherein the sensor module is further operable to check the rotational speed of the anemobiagraph and to send a wind speed signal to the control device;

the control device controlling the power device according to the wind speed signal from the sensor module, to rotate the positioning shaft based upon the wind speed.

8. The vertical shaft wind power system recited in claim 5, wherein the directional shaft is rotatably disposed in a hole in the input shaft; the rotary crankshaft is fixed on an upper end of the directional shaft; the power device is a micro motor the power device connected to a reducer; and the reducer and the directional shaft are connected through a coupler.

9. The vertical shaft wind power system recited in claim 5, wherein the eccentric shaft is arranged on the rotary crankshaft relative to a longitudinal axis of the rotary crankshaft along an axis perpendicular to the direction of wind; the fan blade draw bar and the rotary support cooperating such that the fan blade will arrive at a maximum upwind location and a minimum upwind location when the fan blade is rotating around a central axis of the input shaft; when the fan blade is at the maximum upwind location, a windward side of the fan blade is perpendicular to the wind; when the fan blade is at the minimum upwind location, the windward side of the fan blade is parallels to the wind; the fan blade turns from the maximum upwind location to the minimum upwind location after rotating 180° around the central axis of the input shaft, and the fan blade turns from the minimum upwind location to the maximum upwind location after rotating an additional 180° around the central axis of the input shaft.

10. The vertical shaft wind power system recited in claim 8, wherein the reducer is a turbo-worm reducer.

* * * * *